US008904167B2

(12) United States Patent
Escott et al.

(10) Patent No.: US 8,904,167 B2
(45) Date of Patent: Dec. 2, 2014

(54) METHOD AND APPARATUS FOR SECURING WIRELESS RELAY NODES

(75) Inventors: Adrian Edward Escott, Reading (GB); Anand Palanigounder, San Diego, CA (US); Fatih Ulupinar, San Diego, CA (US); Brian M. Rosenberg, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 13/011,678

(22) Filed: Jan. 21, 2011

(65) Prior Publication Data
US 2011/0185397 A1 Jul. 28, 2011

Related U.S. Application Data

(60) Provisional application No. 61/297,649, filed on Jan. 22, 2010.

(51) Int. Cl.
H04L 29/06 (2006.01)
H04B 7/155 (2006.01)
H04B 7/26 (2006.01)
H04W 12/06 (2009.01)
H04W 16/26 (2009.01)

(52) U.S. Cl.
CPC .............. *H04B 7/155* (2013.01); *H04B 7/2606* (2013.01); *H04W 12/06* (2013.01); *H04W 16/26* (2013.01); *H04L 63/0428* (2013.01); *H04L 63/164* (2013.01)
USPC .............................................. 713/153; 726/3

(58) Field of Classification Search
USPC ......... 726/3, 4, 5, 7; 706/47; 380/23, 258, 30, 380/277; 709/203, 219, 225, 229; 713/153, 713/168, 169, 170
See application file for complete search history.

(56) References Cited

U.S. PATENT DOCUMENTS

| 6,516,316 | B1 * | 2/2003 | Ramasubramani et al. .......... 1/1 |
| 2003/0236980 | A1 | 12/2003 | Hsu |
| 2006/0098614 | A1 | 5/2006 | Moon et al. |

(Continued)

FOREIGN PATENT DOCUMENTS

| CN | 101120609 A | 2/2008 |
| CN | 101292558 A | 10/2008 |

(Continued)

OTHER PUBLICATIONS

Soldani et al., "Wireless Relays for Broadband Access", Mar. 2008, IEEE communications Magazine, pp. 58-66.*

(Continued)

*Primary Examiner* — Jason K. Gee
*Assistant Examiner* — Maung Lwin
(74) *Attorney, Agent, or Firm* — Won Tae Kim

(57) ABSTRACT

In order to mitigate the security risk posed by the insertion of a relay node within a communication network, both device authentication and subscriber authentication are performed on the relay node. Device and subscriber authentication may be bound together so that a relay node is granted access to operate within the network only if both device and subscriber authentication are successful. Additionally, a communication network (or authentication node) may further verify that a subscriber identifier (received as part of subscriber authentication) is associated with the corresponding device type (identified by the device identifier in the corresponding device authentication) as part of the subscriber authentication process.

44 Claims, 8 Drawing Sheets

*EXEMPLARY COMMUNICATION NETWORK WITH RELAY NODE*

(56) References Cited

U.S. PATENT DOCUMENTS

| | | | |
|---|---|---|---|
| 2006/0205341 A1 | 9/2006 | Runyon | |
| 2008/0130597 A1 | 6/2008 | Kalhan | |
| 2008/0139173 A1* | 6/2008 | Yokobori et al. | 455/411 |
| 2008/0189774 A1* | 8/2008 | Ansari et al. | 726/7 |
| 2009/0065571 A1 | 3/2009 | Jain | |
| 2009/0070861 A1* | 3/2009 | Jain | 726/5 |
| 2009/0074189 A1* | 3/2009 | Ryu et al. | 380/277 |
| 2009/0150320 A1* | 6/2009 | Geppert | 706/47 |
| 2009/0217361 A1* | 8/2009 | Crandell | 726/5 |

FOREIGN PATENT DOCUMENTS

| | | |
|---|---|---|
| CN | 101500229 A | 8/2009 |
| EP | 2034781 A2 | 3/2009 |
| EP | 2134116 A1 | 12/2009 |
| JP | H08140136 A | 5/1996 |
| JP | 2001025066 A | 1/2001 |
| JP | 2004297138 A | 10/2004 |
| JP | 2005039317 A | 2/2005 |
| JP | 2006121526 A | 5/2006 |
| JP | 2007281861 A | 10/2007 |
| JP | 2008118536 A | 5/2008 |
| JP | 2008515267 A | 5/2008 |
| JP | 2010050853 A | 3/2010 |
| KR | 20070042243 A | 4/2007 |
| KR | 20090091797 A | 8/2009 |
| WO | WO-2004001985 A2 | 12/2003 |
| WO | 2009154352 A2 | 12/2009 |

OTHER PUBLICATIONS

3GPP group, "3GPP TR 36.806 V0.2.0 (Nov. 2009), 3rd Generation Partnership Project; Technical Specification Group Radio Access Network; Evolved Universal Terrestrial Radio Access (E-UTRA); Relay architectures for E-UTRA (LTE-Advanced) (Release 9)", 2009, 25 pages.*

Anonymous: "3GPP TR 36.806 V0.2.0 (Nov. 2009), Relay architectures for E-UTRA (LTE-Advanced)" 3GPP TSG RAN WG3 Meeting No. 68, Nov. 13, 2009, pp. 1-25, XP002636806, Jeju, Korea Retrieved from the Internet: URL: http://www.3gpp.org/ftp/tsg_ran/WG2_RL2/TSGR2_68/docs/R2-097537.zip [retrieved on May 4, 2011] pp. 6-20.

Anonymous: "Authentication during attach procedure of relay", 3GPP TSG RAN WG3 Meeting No. 68, Nov. 13, 2009, pp. 1-4, XP002636805, 38,39 Jeju, Korea Retrieved from the Internet: URL: http://www.3gpp.org/ftp/tsg_ran/WG2_RL2/TSGR2_68/docs/R2-096507.zip [retrieved on May 4, 2011] pp. 1-3.

International Search Report and Written Opinion—PCT/US2011/022279—ISA/EPO—Jun. 20, 2011.

Taiwan Search Report—TW100102538—TIPO—Jul. 8, 2013.

Jeong E H., et al., "A Design of DA_UDC(Double Authentication User Device Cross) Module using OTA(One Time Authentication) Key in Home Network Environment," The Korean Institute of Communications and Information Sciences Publications vol. 34 No. 4 pp. 419-427, Apr. 2009).

* cited by examiner

EXEMPLARY IMPERSONATION OF RELAY NODE TO ATTACK USER EQUIPMENT

*EXEMPLARY MAN-IN-THE-MIDDLE ATTACK*

FIG. 4    *RELAY NODE AUTHENTICATION SCHEME*

METHOD AND APPARATUS FOR SECURING WIRELESS RELAY NODES

CLAIM OF PRIORITY UNDER 35 U.S.C. §119

The present Application for Patent claims priority to U.S. Provisional Application No. 61/297,649 entitled "Method and Apparatus for Securing Wireless Relays", filed Jan. 22, 2010, assigned to the assignee hereof and hereby expressly incorporated by reference herein.

BACKGROUND

1. Field

One or more features security of communication devices, and more particular to security of relay nodes that serve to wirelessly interface a user equipment to a communication network.

2. Background

3rd Generation Partnership Project 3GPP is a collaboration between groups of telecommunications associations that have joined to define globally applicable third-generation (3G) mobile phone system specifications (e.g., within the scope of the International Mobile Telecommunications-2000 project of the International Telecommunication Union (ITU)) based on evolved Global System for Mobile Communications (GSM) specifications and encompassing radio, core network and service architecture. Among several other standards within 3GPP, Long Term Evolution (LTE) is a standard within the mobile network technology arena.

In the evolution of LTE-compliant networks, relay nodes are being deployed to help extend network coverage to user equipment and to improve cell-edge bandwidth. Unlike other network devices, such as evolved node Bs (eNB), Mobility Management Entity (MME), etc., which operate under the control of operator controlled physical locations, relay nodes tend to be placed closer to the user equipment in physically more accessible or vulnerable locations and operate more independently. As a result, relay nodes are prone to certain new security threats and attacks (e.g., man-in-the-middle attacks, relay node impersonations attacks, etc.) that are not present in other network devices such as eNB or MME.

SUMMARY

A method operational in a relay node is provided. The relay node may be configured to operate between a first access node and a first mobile node by relaying traffic between the first access node and the first mobile node. A first communication interface of the relay node may be adapted to communicate with the first access node, the relay node appearing as a second mobile node to the first access node. A second communication interface of the relay node may be adapted to communicate with the first mobile node, the relay node appearing as a second access node to the first mobile node. The relay node may send a device authentication message to enable device authentication of the relay node. Similarly, the relay node may send a subscriber authentication message to enable subscriber authentication of the relay node, wherein the device authentication is bound to the subscriber authentication in determining whether the relay node can obtain communication service over a communication network. The relay node may obtain access to the communication network upon successful subscriber authentication and device authentication. For example, the relay node may receive a service grant message granting access to the communication network upon successful subscriber authentication and device authentication. Alternatively, the relay node may receive a service denied message denying access to the communication network upon unsuccessful subscriber authentication or device authentication. The device authentication message and the subscriber authentication message may be sent concurrently as a single authentication message. The first communication interface may implement a different over-the-air communication protocol than the second communication interface. Device authentication may be performed using at least one of a device identifier or device key unique to the relay node and stored in a secure, non-removable storage device within the relay node. The device identifier may be at least one of an International Mobile Equipment Identity (IMEI) for the relay node, an access node module within the relay node, or a mobile node module within the relay node. The first communication interface may be part of a mobile access module adapted to operate as an enhanced Node B for a Long Term Evolution-compliant network. The first communication interface may be part of a mobile node module of the relay node and the second communication interface is part of an access node module of the relay node. Subscriber authentication may be subsequently repeated more frequently than device authentication. A subscriber identifier or key used in subscriber authentication may be pre-associated with a device type, and subscriber authentication is successful only if the device authentication identifies the same device type.

Additionally, the relay node may be configured to translate traffic of a first packet type received over the first communication interface to a second packet type for transmission over the second communication interface. Similarly, the relay node may be configured to translate traffic of the second packet type received over the second communication interface to the first packet type for transmission over the first communication interface. That is the relay node may be configured to translate data traffic transmissions between the first communication interface and the second communication interface from a first signal type to a second signal type.

A method operational in a network authentication entity is also provided. A device authentication message may be received by the authentication entity, the device authentication message originated by a relay node that operates between a first mobile node and a first access node. The authentication entity may then perform device authentication based on one or more device identifiers or keys associated with the relay node, an access node module of the relay node, or a mobile node module of the relay node. A subscriber authentication message may also be received at the authentication entity, the subscriber authentication message originated by the relay node. The authentication entity may then performs subscriber authentication based on one or more subscriber identifiers or keys associated with the relay node. A message granting the relay node access to the communication network may then be sent upon successful subscriber authentication and device authentication. Alternatively, a message denying the relay node access to the communication network may be sent upon unsuccessful subscriber authentication or device authentication. A subscriber identifier or key used in subscriber authentication may be pre-associated with a device type, and subscriber authentication is successful only the device authentication identifies the same device type. The device authentication message and the subscriber authentication message may be received concurrently as a single authentication message.

The authentication entity may send a first message to the relay node to initiate device authentication; and/or may send a second message to the relay node to initiate subscriber authentication. Device authentication may be performed by a device authentication node while subscriber authentication is performed by a subscriber authentication node.

DETAILED DESCRIPTION

In the following description, specific details are given to provide a thorough understanding of the described implementations. However, it will be understood by one of ordinary skill in the art that the implementations may be practiced without these specific details. For example, circuits may be shown in block diagrams in order not to obscure the implementations in unnecessary detail. In other instances, well-known circuits, structures and techniques may be shown in detail in order not to obscure the implementations.

The word "exemplary" is used herein to mean "serving as an example, instance, or illustration." Any implementation or embodiment described herein as "exemplary" is not necessarily to be construed as preferred or advantageous over other embodiments. Likewise, the term "embodiments" does not require that all embodiments include the discussed feature, advantage or mode of operation. The terms "relay node" and "user equipment" as used herein are meant to be interpreted broadly. For example, a "relay node" may refer to a device that facilitates wireless connectivity (for one or more user equipment) to a communication or data network. Furthermore, the terms "user equipment" and/or "mobile node" and/or "client terminal" may include mobile phones, pagers, wireless modems, personal digital assistants, personal information managers (PIMs), palmtop computers, laptop computers, digital tablets, and/or other mobile communication/computing devices which communicate, at least partially, through a wireless or cellular network. The term "access node" may refer to a device coupled to a communication network and provides wireless connectivity between one or more mobile nodes to the communication network.

Overview

In order to mitigate the security risk posed by the insertion of a relay node within a communication network, both device authentication and subscriber authentication are performed on the relay node. Device and subscriber authentication may be bound together so that a relay node is granted access to operate within the network only if both device and subscriber authentication are successful. Additionally, a communication network (or authentication node) may further verify that a subscriber identifier (received as part of subscriber authentication) is associated with the corresponding device type (identified by the device identifier in the corresponding device authentication) as part of the subscriber authentication process.

Exemplary Communication Network with Relay Node

Figure 1:
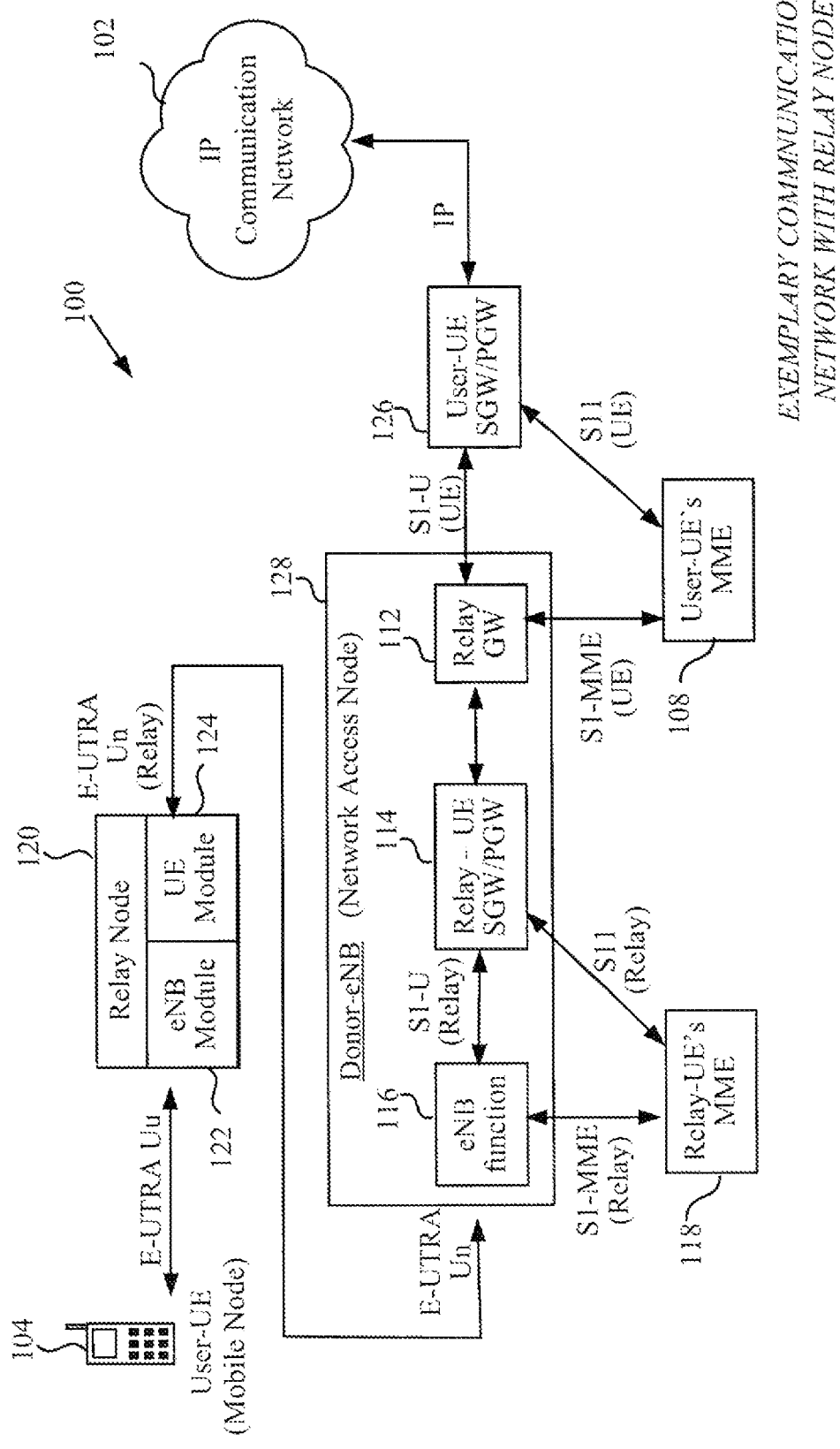
FIG. 1 is a block diagram of an exemplary communication network with a relay node.

FIG. 1 is a block diagram of an exemplary communication network with a relay node. The communication network 100 may comprise an IP communication network 102 (e.g., a Long Term Evolution (LTE)-compatible network), a user-UE serving gateway (SGW)/PDN gateway (PGW) 126, a donor eNB 128 (also referred to as an access node), a relay node 120, and a user equipment (user-UE) 104 (also referred to as a mobile node). The relay node 120 couples to the communication network 102 via the donor eNB 128 and the user-UE serving gateway (SGW)/PDN gateway (PGW) 126. To the communication network 102 and donor eNB 128, the relay node 120 may appear as a user equipment (e.g., UE). To the user equipment (user-UE) 104, the relay node 120 may appear as an enhanced Node B (eNB). For this purpose, the relay node 120 may include an eNB module 122 (to appear as a network gateway to the UE 104) and a UE module 124 (to appear as a UE to the network 102).

From the point of view of the communication network 102, the relay node 120 appears as a user equipment. Communications to/from the relay node 120 and the communication network 102 are performed via the UE module 124 (e.g., using Evolved Universal Terrestrial Access (E-UTRA) Un signal protocol/interface).

Similarly, from the point of view of the user-UE 104, the relay node 120 appears as a network eNB. Communications to/from the relay node 120 and the user-UE 104 are performed via the eNB module 122 (e.g., using Evolved Universal Terrestrial Access (E-UTRA) Uu signal protocol/interface). While eNBs are typically coupled to the communication network 102 by a wired connection (e.g., fiber optic connection, etc.), the relay node may use over-the-air signaling (e.g., LTE-compliant protocol) to communicate with the eNB.

In one example, the donor eNB 128 may include the functionality of an eNB 116, a relay-UE SGW/PGW 114, and/or a relay gateway 112. Communications between the relay gateway 112 and the user-UE SGW/PGW 126 may use the S1-U (UE) signal protocol/interface. Similarly, communications between the eNB 116 and the relay-UE SGW/PGW 114 may use the S1-U (Relay) signal protocol/interface.

E-UTRA Uu and Un refer to the typical signaling protocols/interfaces between the user-UE 104 and a relay node 120, and the relay node 120 and donor-eNB 128, respectively. The E-UTRA Uu and Un interfaces may be the LTE network interface for providing packet data services over the radio to/from the user-UE 104.

3GGP Technical Specification (TS) 36.41x series of technical specifications also define the S1 interface for the interconnection of the Evolved NodeB (eNB) component of the Evolved Universal Terrestrial Radio Access Network (E-UTRAN) to the Core Network of the System Architecture Evolution (SAE)/Evolved Packet Core (EPC) system. Thus, communications between the eNB 116 and relay-UE SGW/PGW 114 may use the S1 signaling protocol/interface.

In one example, the serving gateways (i.e., relay-UE SGW 114 and/or user-UE SGW 126) route and forward user data packets, while also acting as the mobility anchor for the user plane during inter-eNB handovers and as the anchor for mobility between LTE and other 3GPP technologies (terminating S4 interface and relaying the traffic between 2G/3G systems and PGW). Similarly, the PDN Gateways (PGW) (e.g., relay-UE UE PGW 114 and user-UE PGW 126) may provide connectivity from the UE to external packet data networks by being the point of exit and entry of traffic for the UE. A UE may have simultaneous connectivity with more than one PGW for accessing multiple PDNs. The PGW may perform policy enforcement, packet filtering for each user, charging support, lawful Interception and packet screening. Another role of the PGW is to act as the anchor for mobility between 3GPP and non-3GPP technologies such as WiMAX and 3GPP2 (CDMA 1× and EvDO).

In the example of FIG. 1, the communication network 102 may be adapted to recognize that the user-UE 104 is coupled via the donor eNB 128. Thus, the user-UE SGW/PGW 126 is told by the user-UE Mobile Management Entity (MME) 108 to forward communications for the user-UE 104 via the relay GW 112 of the donor eNB 128. Because the user-UE 104 is in fact connected via the relay node 120, a relay-UE SGW/PGW 114 is configured by the relay-UE Mobile Management Entity (MME) 118 to route the communications for the user-UE 104 to the relay node 120. Note that, because the relay node 120 appears just as another UE (i.e., UE Module 124), the donor eNB 116 protocols and/or operations do not need to be modified. This allows reuse of existing protocols/interfaces at the eNB and relay node. Note that, for purposes of illustration two separate MMEs (i.e., user-UE MME 108 and relay-U MME 118) are shown in FIG. 1. However, in some implementations, the functions performed by the user-UE MME 108 and relay-U MME 118 may be combined into a single MME device.

Many communication systems rely on subscriber/user authentication prior to granting network access. This may be done by use of a removable subscriber module or smartcard (e.g., also known as Universal Integrated Circuit Card (UICC) in LTE-compliant networks) that couples to a UE or UE module and contains one or more keys used to authenticate the subscriber/user (e.g., to implement authentication and key agreement (AKA)). In one example, the UE module 124 in the relay node 120 may include at least one such removable smartcard. However, because such subscriber/user authentication procedure is designed to allow users/subscribers to change/upgrade UEs (i.e., the smartcard can be moved to different UEs), the removable smartcard does not serve to authenticate the UE module 124 or the relay node 120.

While introducing the relay node 120 between the user-UE 104 and the donor eNB 128 facilitates extending a network coverage area, it also provides a point of attack which can be exploited to gain unauthorized access to data transmissions. A few of these attacks include impersonation attacks and man-in-the-middle attacks.

Various security features may be implemented with relation to the relay node 120 so that transmissions through the relay node 120 are as secure as transmissions through a typical eNB. That is, the security of a communication system/network should not be reduced or compromised due to the insertion of a relay node into the communication system.

Exemplary Threats to Relay Nodes in Communication Networks

Figure 2:
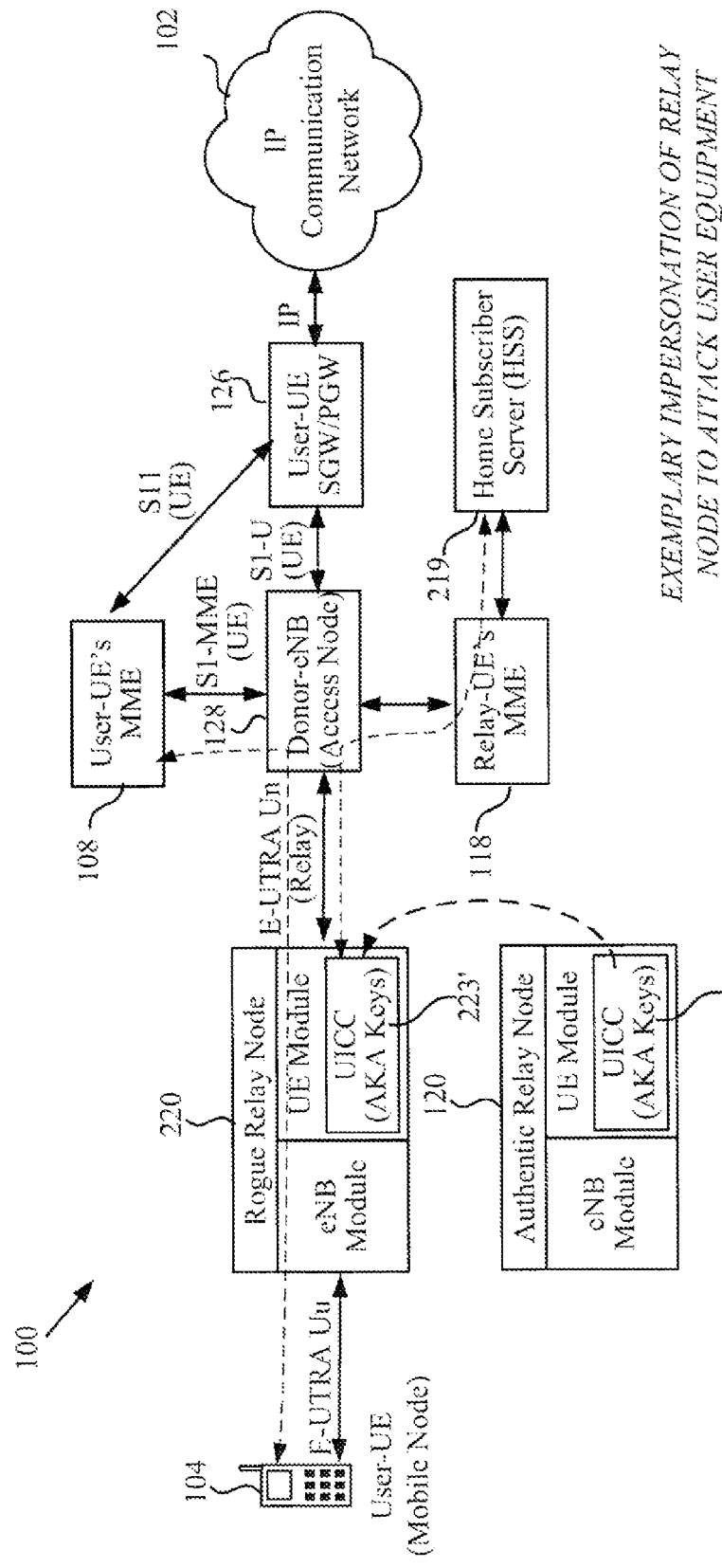
FIG. 2 illustrates impersonation of a Relay Node to attack User-UE attached to a Relay Node.

Threat 1: Impersonation of a Relay Node to Attack User-UE Attached to Relay Node FIG. 2 illustrates impersonation of a relay node to attack user-UE attached to a relay node. In an impersonation attack, the attacker may remove a Universal Integrated Circuit Card (UICC) 223 from the authentic relay node 120 and inserts it into a rogue relay node 220. The UICC 223 serves to authenticate a service subscription with a home subscriber server (HSS) 219. However, there is no authentication of a relay node as a device, only the subscription in the UICC that is inserted in the relay node. Consequently, the communication network can not detect the rogue relay node 220 and hence keys related to the user-UE 104 are passed to the rogue relay node 220. This allows the user-UE 104 to attach to the rogue relay node 220 and hence security of data transmissions to/from the user-UE 104 may be compromised.

Threat 2: Man-In-The-Middle Relay Node Attack at Un Interface

Figure 3:
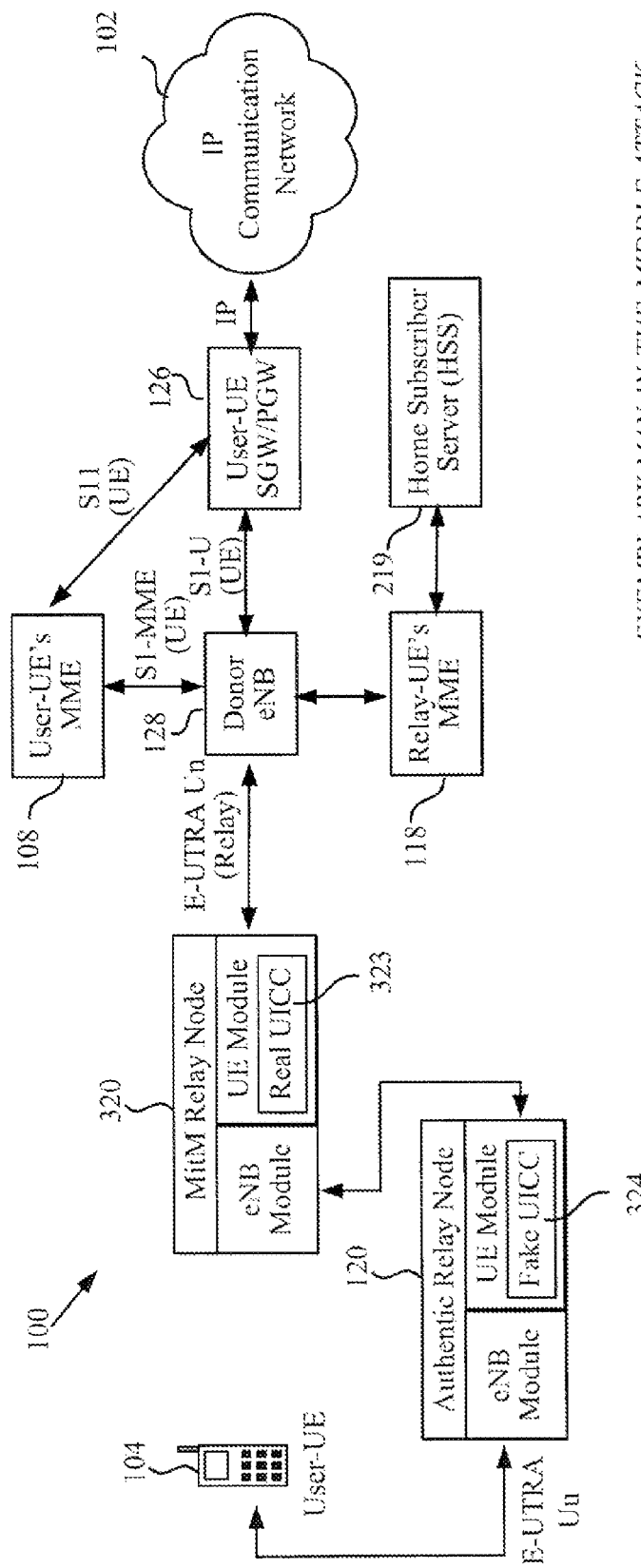
FIG. 3 illustrates a man-in-the-middle (MitM) relay node attack.

FIG. 3 illustrates a man-in-the-middle (MitM) relay node attack. In this case, the real UICC in the authentic relay node 120 may have been replaced with a fake UICC 324. The real UICC 323 is then inserted in a MitM relay node 320. In this attack, a MitM relay node 320 is inserted in between the authentic relay node 120 and donor eNB 128. Because the attacker knows the root key for the fake UICC 324, the MitM relay node 320 can intercept and decode messages to/from authentic relay node 120. The MitM relay node 320 can transparently transmit, receive, view, and/or modify the traffic between the authentic relay node 120 and the donor eNB 128 without either the authentic relay node 120 or the donor eNB 128 being aware of it. Hence, the security of any data transmission from/to the user-UE 104 connected to the real relay node 324 may be compromised. Note that the MitM relay node 320 can view, modify, and/or inject user traffic even if the user related keys are protected by a secure protocol (such as IPsec) between the MMEs 108 and 118 serving the user-UE 104 and the relay node 120. The security point illustrated by this attack is that not only is device authentication of the relay node 120 needed, but that all security tunnels from the authentic relay node 120 terminate in the real network (i.e., donor eNB 128) instead of in a MitM relay node 320.

Threat 3: Intercepting/Injecting Traffic Between the Relay Node and Donor eNB Interface Referring again to FIG. 1, the interface between the relay node 120 and Donor eNB 128 is based on the standard E-UTRAN air interface. This means that all the non-radio resource control (RRC) signaling traffic between the relay node 120 and Donor eNB 128 is not integrity protected. While this is acceptable for user traffic from the user-UE 104, it is not acceptable for signaling traffic (either S1-AP or X2-AP) from the relay node 120 to the communication network (e.g., donor eNB 128). This means that the interface (i.e., referred to as Un interface) between user-UE 104 and Donor eNB 128 needs to be protected. Therefore, either the Un interface can not be a standard E-UTRAN UE-eNB interface or some other method of protecting the S1-AP and X2-AP signaling across the Un interface needs to be used.

Threat 4: Impersonation of a Relay Node to Attack the Network

Referring again to FIG. 2, the rogue relay node 220 could insert essentially three types of traffic into the communication network. First, it could insert Non-Access Stratum (NAS) signaling towards the Relay-UE MME 118. However, this same attack could be done with a rogue user-UE so consideration of this attack is not significant for the relay node security analysis. Secondly, the rogue relay node 220 could insert S1-AP or X2-AP signaling. Third, the rogue relay node 220 could also insert user plane traffic to either try to get IP connectivity or insert data on behalf another user.

Exemplary Security Procedure for Relay Nodes

In order to mitigate or counteract the security threats to the relay node and/or the core communication network/system in which the relay node operates, various security measures may be implemented on the relay node. Consequently, techniques, protocols, and/or methods are herein described to enhance the security of relay nodes and/or communication networks/systems to various types of security threats so that, ideally, a relay node is as secure as an eNB.

One aspect to providing such security includes performing device authentication of the relay node before it is allowed to communicate over the communication network. For instance, both device authentication and subscriber authentication (e.g., E-UTRAN authentication) may be performed for the relay node. The results of device and subscriber authentication may be bound so that if either one fails the relay node is unable to operate over the communication network. Such binding of the device authentication and subscriber authentication may be performed using either cryptographic means by mixing the keys generated as part of the authentication process or procedural means, e.g., network (or an network trusted module such as the UICC) verifies that both device authentication and the subscriber authentication procedures originate from the same entity). Note that by such binding, the use of a fake UICC of Threat 2 (i.e., a man-in-the-middle attack of FIG. 3) prevents the relay node from gaining access to the communication network since device authentication would fail.

In one implementation, such binding may be provided by provisioning AKA keys (and implement related AKA "f" functions) directly within a secure storage or environment for the relay node rather than storing these in a removable UICC card. By placing the AKA keys (typically used for subscriber authentication) within a secure, non-removable storage of the relay node, the AKA keys effectively also act as device keys. Thus, subscriber authentication also acts as "device authentication" in this case.

In a second implementation, the E-UTRAN security procedures may be enhanced to also provide device authentication based on a credential stored in the relay node. This effectively binds the E-UTRAN security procedures (e.g., subscriber authentication) with the device authentication based on the relay node's device identity, such as the IMEI of the UE module or the identity of the eNB module of the relay node). Such binding mitigates the threats since they provide the communication network and relay node with assurance that the other is genuine. This addresses some of the attacks in Threats 2 and 4.

Yet another feature of binding device authentication and subscriber authentication is the ability of the communication network to further verify a relationship between the subscriber and the device. For example, a particular subscriber or service plan may be associated with relay node devices. Therefore, as part of authentication, the communication network (e.g., authentication node) may ascertain whether a subscriber identifier it receives (e.g., during subscriber authentication) corresponds to the device identified by a received device identifier. For example, if the communication network receives a subscriber identifier known to be associated a relay node device type, but receives a corresponding device identifier for a mobile device (non-relay device), then the communication network may reject service to the requesting device.

Other security aspects may further employ a security protocol, such as IPsec, between the relay node and the communication network for the purpose of securing control plane signaling. For example, 3GPP Technical Specification 33.401 v9.6.0 (incorporated herein by reference), clause 11 defines the use of IPsec for protection of the S1 and X2 control plane for evolved packet system (EPS) and E-UTRAN compatible networks. This security measure inhibits or prevents the Threats 1, 3, and 4 noted above. The overhead caused by the use of IPsec over the control signaling plane is negligible, since there is little control signaling compared to user plane traffic. In yet another example, IPsec over the user plane (for traffic) may be implemented in the S1-U and X2-U interfaces, as described in clause 12 of 3GPP Technical Specification 33.401. While this might not be suitable for all deployments due to the overhead of using IPsec on small user plane packets, it may be a reasonable solution for the deployments which media traffic such as RTP will not be carried over LTE. It also has the advantage of requiring no protocol enhancements over the macro network. Using IPsec for both control plane and user plane solves Threat 2 in the sense that while there could still be a MitM node, all the genuine UE related traffic available in the MitM relay node is protected. Additionally, the inserted traffic attack in Threats 3 and 4 is also mitigated by this solution by getting the P-GW serving the relay node to route its traffic through security gateways in the operator's network. This ensures that any inserted traffic is dropped, as it is not protected by IPsec.

Figure 4:
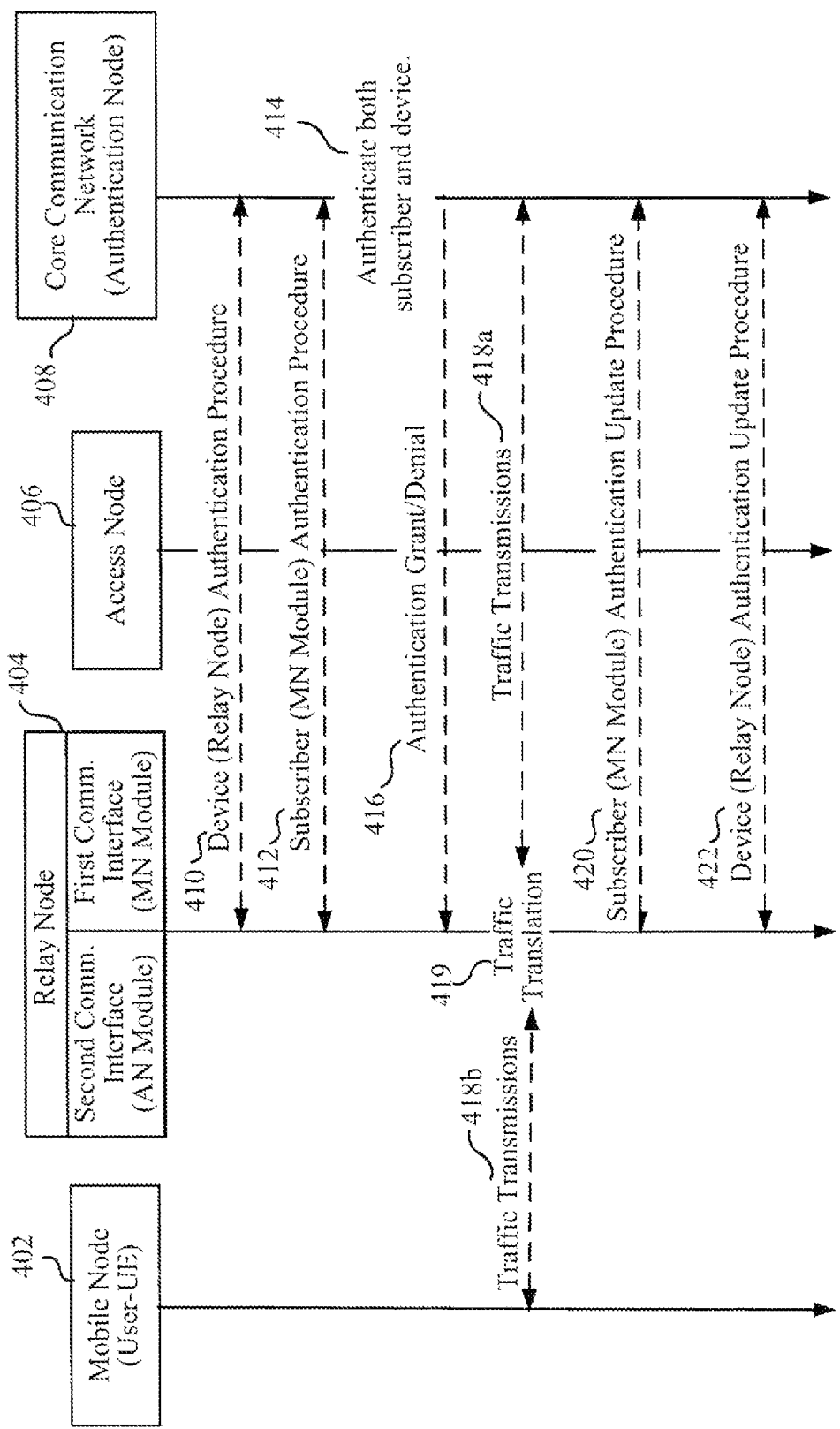
FIG. 4 illustrates an example of how a relay node may be secured against attackers by implementing device authentication.

FIG. 4 illustrates an example of how a relay node may be secured against attackers by implementing device authentication. Here, the relay node 404 may wirelessly transfer traffic between a mobile node 402 and an access node 406. The access node 406 may transmit traffic between a core communication network 408 and the relay node 404. Note that the core communication network 408 may be a home network, a visited network, and/or components or nodes in one or both the home and visited networks.

In one example, the relay node 404 may include a first communication interface (e.g., mobile node module or UE Module) to communicate with the access node 406 and a second communication interface (e.g., access node module or eNB Module) to communicate with the mobile node 402. Thus, the relay node 404 may appear as a mobile node to the access node 406, and it may appear as a network access node to the mobile node 402. For instance, the first communication interface may implement a different over-the-air communication protocol than the second communication interface. Thus, the relay node may perform translation of signals, messages, and/or packets between the first communication interface and the second communication interface.

Prior to being able to provide relay service, the relay node 404 may perform authentication procedures with the core communication network 408. For instance, the core communication network 408 may include entities in a home network and/or a visited network which are responsible for and/or configured to authenticate a subscriber and/or device. For example, some these entities that may be involved either directly or indirectly in the authentication procedure within an LTE-compatible network include an evolved node Bs (eNB), Mobility Management Entity (MME), and/or a home subscriber server.

Prior to being able to provide relay services, the relay node 404 may participate in a device authentication procedure 410 with the core communication network 408. The device authentication procedure 410 may seek to authenticate the relay node 404 with the core communication network 408. Such device authentication procedure 410 may use one or more device identifiers and/or keys (e.g., stored in a secure storage of the relay node) that are specific to the relay node (or a component of the relay node) to authenticate the relay node 404 with the core communication network 408. The one or more device identifiers and/or keys may be stored, for example, within a non-removable and/or non-user accessible storage in the relay node 404. This prevents an attacker from trying to gain access to the device identifiers and/or key(s) at the relay node. In some examples, the unique device identifiers for the relay node may be an International Mobile Equipment Identity (IMEI) for the mobile node module and/or an identity for the access node module and may be securely bound with the device keys. In some examples, the subscription identifiers may be an International Mobile Subscriber Identity (IMSI) (e.g., permanent subscription identity) and/or Globally Unique Temporary UE Identity (GUTI) (e.g., temporary subscription identity used in LTE).

In some implementations, the relay node 408 may unilaterally or independently send a device authentication message to the core communication network 408 to initiate the device authentication process 410. In other implementations, the core communication network 408 may initiate the device authentication procedure by requesting that the relay node 408 send a device authentication message. For example, the core communication network 408 may send a challenge message to the relay node 404. The relay node 404 then uses information (e.g., data, values, functions, etc.) from the challenge and its one/or more device identifier(s)/key(s) to generate a device authentication message that is sent to the core communication network 408. For instance, the relay node 404 simply cryptographically signs its device identifier (and possibly other information received in the challenge message) with its device key and sends an authentication message that includes the device key and the signed device key to the core communication network 408. The core communication network 408 then authenticates the relay node 404 by using a device key known to the core communication network 408 and associated with the relay node 404 to verify the signed device identifier. Other cryptographic methods and/or algorithms may be used, where the subscriber key may be a symmetric key (e.g., secret key) or an asymmetric key (e.g., public/private key pair).

Additionally, the relay node 404 may also participate in a subscriber authentication procedure 412. The subscriber authentication procedure 412 may seek to authenticate a user/subscriber (e.g., the mobile node module or UE Module of the relay node) for the relay node 404 with the core communication network 408. Such subscriber authentication message 412 may use one or more identifiers and/or keys (e.g., stored in the mobile node module or UE Module of the relay node) that are specific to the subscriber (associated with the relay node or mobile node module) to authenticate itself with the core communication network 408. The one or more identifiers and/or keys for subscriber authentication may be stored, for example, in a removable smartcard.

In some implementations, the relay node 408 may unilaterally or independently send a subscriber authentication message to the core communication network 408 to initiate the subscriber authentication process 412. In other implementations, the core communication network 408 may initiate the subscriber authentication procedure 412 by requesting that the relay node 408 send a subscriber authentication message. For example, the core communication network 408 may send a challenge message to the relay node 404. The relay node 404 then uses information (e.g., data, values, functions, etc.) from the challenge and its one/or more subscriber identifier(s)/key(s) to generate a subscriber authentication message that is sent to the core communication network 408. For instance, the relay node 404 simply cryptographically signs its subscriber identifier (and possibly other information received in the challenge message) with its subscriber key and sends an authentication message that includes the subscriber key and the signed subscriber key to the core communication network 408. The core communication network 408 then authenticates the relay node 404 by using a subscriber key known to the core communication network 408 and associated with the relay node 404 to verify the signed subscriber identifier. Other cryptographic methods and/or algorithms may be used, where the subscriber key may be a symmetric key (e.g., secret key) or an asymmetric key (e.g., public/private key pair).

Upon receipt of a subscriber authentication message and a device authentication message, one or more components of the core communication network 408 (e.g., one or more authentication nodes) may perform authentication of both the subscriber and the device 414. For instance, the core communication network 408 (or one or more of its components) may have prior access to information (e.g., keys and/or identity information) to verify the authenticity of the relay node 404 and/or its subscriber information. An authentication grant/denial message 416 may then be sent by the core communication network 408 to other network components (e.g., network access node or eNB) and/or the relay node 404. If authentication has been successful, the relay node 404 may operate to send traffic transmissions 418*a* and 418*b* between the mobile node 402 and the access node 406 to the core communication network 408. In some implementations, the relay node 404 may perform traffic translation 419 between the its first communication interface and its second communication interface to convert between distinct traffic transmissions. If authentication failed, then the relay node 404 is denied access to transmit traffic to the core communication network 408. In this manner, device authentication is bound to the subscriber authentication by the core communication network 408. If either authentication fails, then the relay node is denied access to transmit traffic over the access node 406.

In some implementations, device authentication 410 is performed prior to subscriber authentication 412. By performing device authentication first, the core network may ascertain characteristics of the type of device requesting authentication. This may be helpful to the communication network in subsequently ascertain whether a corresponding subscriber identifier (e.g., received as part of a subscriber authentication procedure) is being used with the correct type of device or not. For instance, if a subscriber identifier is meant for relay node devices but is being used with a device identifier for a mobile node, then device/subscriber authentication is denied. In other implementations, subscriber authentication may be performed prior to device authentication. In another alternative implementation, both device authentication and subscriber authentication may be combined in to a single authentication procedure/message so that they occur concurrently. The cryptographic keys used for relay node device authentication may be a symmetric key (e.g., secret key) or an asymmetric key (e.g., public/private key pair).

A subscriber authentication update procedure 420 may be subsequently repeated (e.g., every day or two) for continued verification. Similarly, a device authentication procedure 422 may also be repeated (e.g., every week or every month), but less frequently than subscriber authentication 420.

Exemplary Relay Node and Operations Therein

Figure 5:
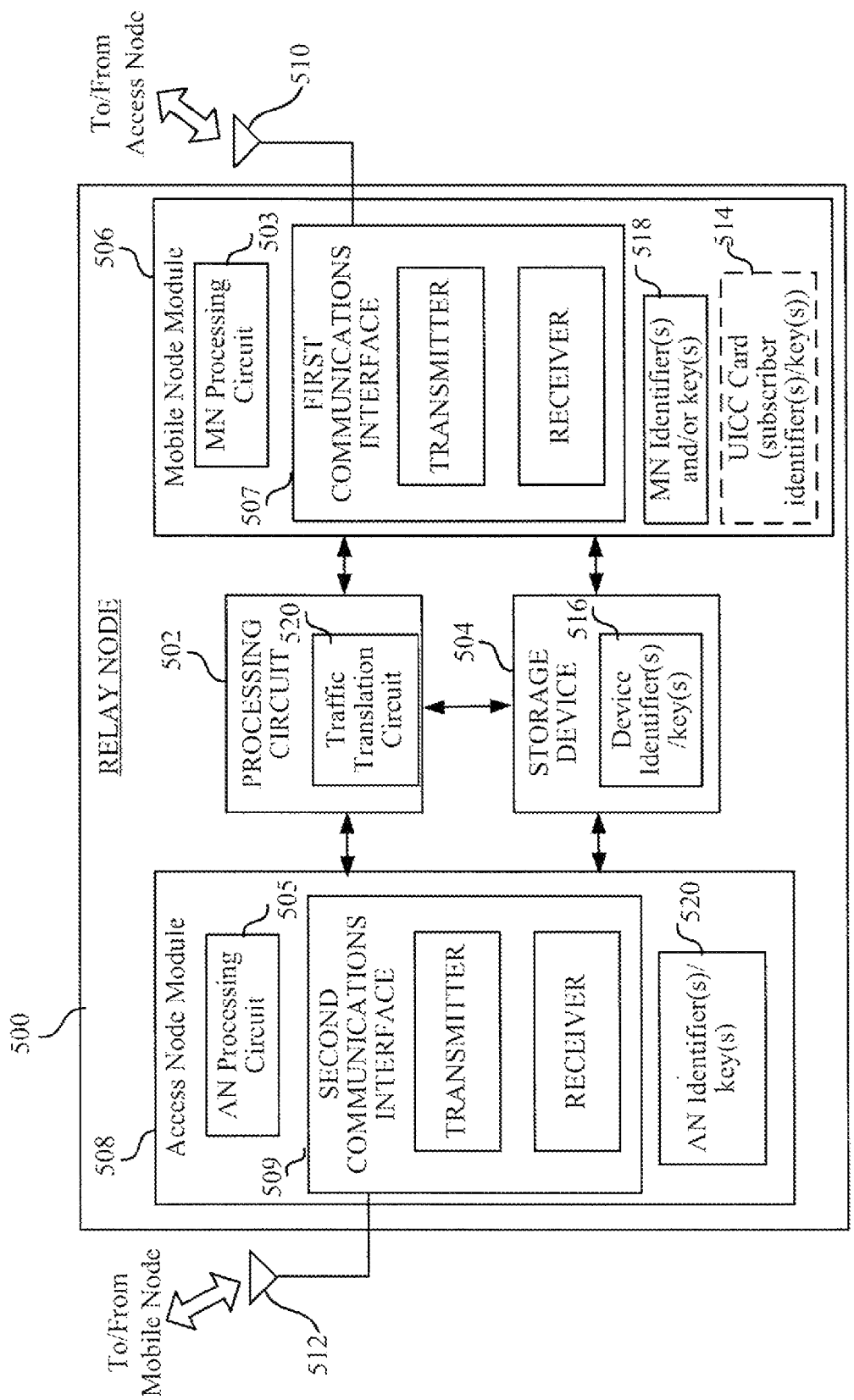
FIG. 5 is a block diagram illustrating an exemplary relay node.

FIG. 5 is a block diagram illustrating an exemplary relay node. The relay node 500 may include a processing circuit 502 coupled to a mobile node module 506, an access node module 508 and/or an internal, secure storage device 504. The mobile node module 506 may include a first communication interface 507 including a transmitter and a receiver for communicating to/from an access node via a first antenna 510. The mobile node module 506 may also include a mobile node (MN) processing circuit 503 that may control data transfers to/from the first communication interface among other functions/operations of the mobile node module 506. The mobile node module 506 may also include a storage device 518 where it may maintain one or more mobile node device identifiers which uniquely identify the mobile node module 506. Additionally, the mobile node module 506 may be coupled to or in communication with a removable UICC card 514 in which subscriber/user authentication information (e.g., keys and subscription identifier(s)) may be stored.

Similarly, the access node module 508 may include a second communication interface 509 including a transmitter and a receiver for communicating to/from a mobile node via a second antenna 512. The access node module 508 may also include an access node (AN) processing circuit 505 that may control data transfers to/from the second communication interface among other functions/operations of the access node module 508. The access node module 508 may also include a storage device 520 where it may maintain one or more access node device identifiers which uniquely identify the access node module 506.

The relay node 500 may also include a processing circuit 502 coupled to the mobile node module 506, the access node module 508, and/or a storage device 504. The processing circuit 502 may be adapted to transfer data between the access node module 508 and the mobile node module 506, possibly by using the storage device 504 as a buffer or queue. Additionally, the processing circuit 502 may include a traffic translation circuit 520 that translates traffic formats/protocols between the access node module 508 and the mobile node module 506. For instance, the traffic translation circuit 520 may translate data traffic transmissions between the first communication interface 507 and the second communication interface 509 from a first signal type to a second signal type.

Note that while the mobile node module 506, processing circuit 502 and access node module 508 are illustrated as separate components or circuits in FIG. 5, their functions and/or operations may be combined into a single circuit (e.g., an integrated circuit).

The storage device 504 may also include one or more device identifiers 516 that uniquely identify the relay node 500, the access node module 508, and/or the mobile node module 506. These one or more device identifiers 516, the one or more mobile node device identifiers 518, and/or the one or more access node device identifiers 520 may be used by the relay node in performing device authentication. Because these identifiers and the keys associated with the device identifiers are stored internally and securely (i.e., the keys are not accessible to an attacker), they are not available to an attacker. The keys associated with the device identifiers may be either asymmetric or symmetric keys. One or more of these identifiers may be used for device authentication of the relay node 500 while the subscriber/user information (in the UICC card 514) may serve for subscriber/user authentication.

Figure 6:
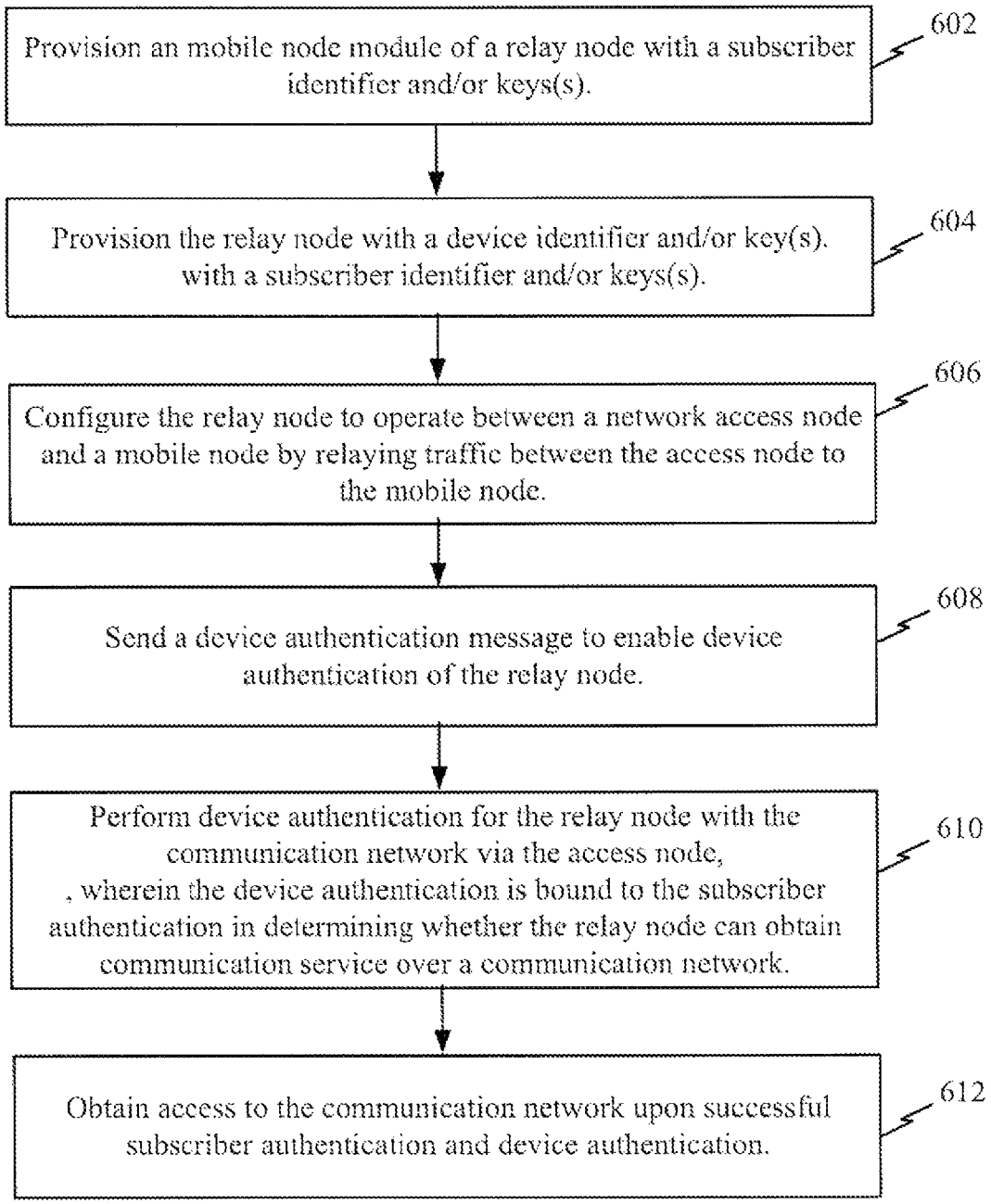
FIG. 6 illustrates a method operational in a relay node to mitigate attacks by performing device authentication.

FIG. 6 illustrates a method operational in a relay node to mitigate attacks by performing device authentication. The relay node may operate between a network access node and a mobile node. The relay node may include an access node module and a mobile node module. The mobile node module of the relay node may include a first communication interface adapted to communicate with the access node. The mobile node module causes the relay node to appear as a mobile node to the access node. The access node module of the relay node may also include a second communication interface to communicate with the mobile node, the relay node appearing as a network access node to the mobile node.

The relay node and/or the mobile node module may be provisioned with a subscriber identifier and/or key(s) 602. For example, such subscriber identifier and/or key(s) may be stored in a removable card that couples to the mobile node module. The relay node, access node module, and/or mobile node module may also be provisioned with one or more device identifiers and/or associated key(s) 604. For example, such device identifier(s)/key(s) may be stored in one or more secure locations within the relay node, mobile node module, and/or access node module. The keys associated with the device identifiers may be either asymmetric or symmetric keys.

The relay node may be configured to transmit, translate, relay, and/or route traffic between a network access node and a mobile node 606. For example, the relay node, and/or mobile node module therein, may include a first communication interface adapted to communicate with the access node, the relay node appearing as a mobile node to the access node. Similarly, the relay node, and/or access node module therein, may include a second communication interface to communicate with the mobile node, the relay node appearing as a network access node to the mobile node.

Prior to being allowed to communicate over the network, the relay node may send one or more messages for device and/or subscriber authentication. For example, the relay node may send a device authentic message to enable device authentication of the relay node 608. For instance, the device authentication message may be sent to a first MME in the communication network via the access node. Similarly, the relay node may send a subscriber authentication message to enable subscriber authentication of the relay node (or at least a mobile node module therein), wherein the device authentication is bound to the subscriber authentication in determining whether the relay node can obtain communication service over a communication network 610.

The relay node may then obtain access to the communication network upon successful subscriber authentication and device authentication 612. For example, the relay node may receive a service grant message granting access to the communication network upon successful subscriber authentication and device authentication. Alternatively, the relay node may receive a service denied message denying access to the communication network upon unsuccessful subscriber authentication or device authentication. In one example, the device authentication message and the subscriber authentication message may be sent concurrently as a single authentication message.

The first communication interface may implement a different over-the-air communication protocol than the second communication interface. Device authentication may be performed using at least one of a device identifier or device key unique to the relay node and stored in a secure, non-removable storage device within the relay node. The device identifier may be at least one of an International Mobile Equipment Identity (IMEI) for the relay node, an access node module within the relay node, or a mobile node module within the relay node. The first communication interface may be part of a mobile access module adapted to operate as an enhanced Node B for a Long Term Evolution-compliant network. The first communication interface may be part of a mobile node module of the relay node and the second communication interface is part of an access node module of the relay node. Subscriber authentication may be subsequently repeated more frequently than device authentication.

Additionally, the relay node may be configured to translate traffic of a first packet type received over the first communication interface to a second packet type for transmission over the second communication interface. Similarly, the relay node may be configured to translate traffic of the second packet type received over the second communication interface to the first packet type for transmission over the first communication interface.

Exemplary Core Network Authentication Device(s) and Operations Therein

Figure 7:
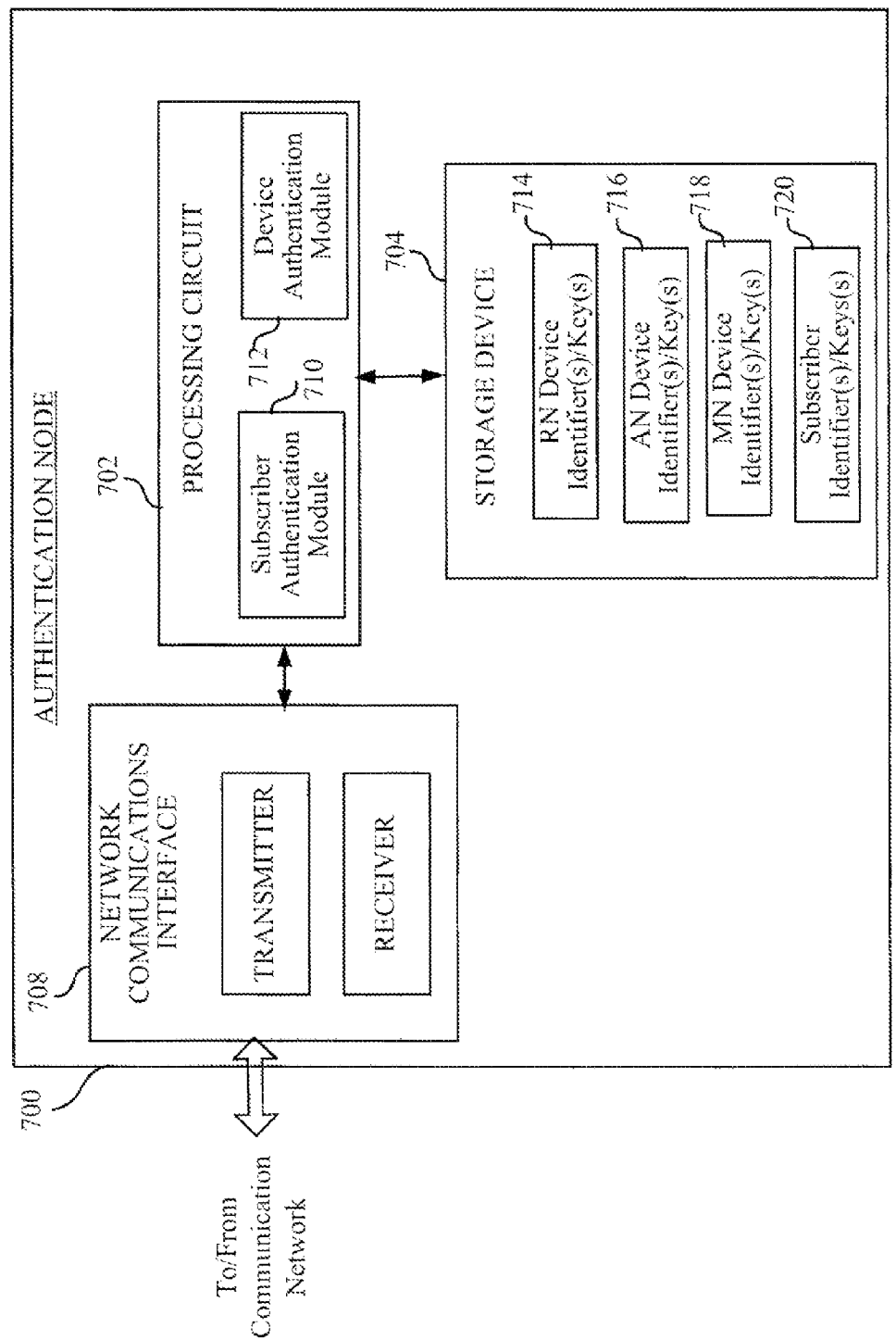
FIG. 7 is a block diagram illustrating select components of an authentication node according to at least one implementation.

FIG. 7 is a block diagram illustrating select components of an authentication node 700 according to at least one implementation. The authentication node may be implemented as one ore more devices that perform the same functions of the authentication node 700. The authentication node 700 may include a processing circuit 702, coupled to a communications interface 708 and to a storage device 704.

In one example, the processing circuit 702 may be implemented as one or more of a processor, a controller, a plurality of processors and/or other structure configured to execute executable instructions including, for example, software and/or firmware instructions, and/or hardware circuitry. Embodiments of the processing circuit 702 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor but, in the alternative, the processor may be any conventional processor, controller, microcontroller, or state machine. A processor may also be implemented as a combination of computing components, such as a combination of a DSP and a microprocessor, a number of microprocessors, one or more microprocessors in conjunction with a DSP core, or any other such configuration. These examples of the processing circuit 702 are for illustration and other suitable configurations within the scope of the present disclosure are also contemplated.

The processing circuit 702 may be adapted to receive and/or transmit messages from the communication network via the network communications interface 708. For this purpose, the network communications interface 708 may include a transmitter and a receiver. The processing circuit 702 may comprise circuitry configured to implement desired programming provided by appropriate media in at least one embodiment. For example, the processing circuit may include and/or implement a subscriber authentication module 710 and/or a device authentication module 712.

Upon receiving a subscriber authentication message originated by a relay node, the subscriber authentication module 710 may obtain a subscriber identifier(s)/key(s) associated with the relay node which is then used to authenticate the relay node. Such subscriber authentication may involve verifying that certain information in the subscriber authentication message really originated from a valid subscriber. For example, this subscriber authentication may involve using a subscriber key to regenerate and/or verify information in the subscriber authentication message.

Upon receiving a device authentication message originated by the relay node, the device authentication module 712 may obtain one or more relay node (RN) device identifier(s)/key(s) 714, access node component identifier(s) 716, and/or mobile node component identifier(s)/key(s) 718 associated with the relay node. The one or more device identifiers/keys are then used to authenticate the relay node. For example, this device authentication may involve using a device identifier(s)/key(s) to regenerate and/or verify information in the device authentication message.

Note that, in other implementations, subscriber authentication and/or device authentication may involve a series of messages between the authentication node 710 and the relay node.

If both subscriber authentication and device authentication are successful, then the authentication node 700 may send a message granting the relay node access to the communication network.

Figure 8:
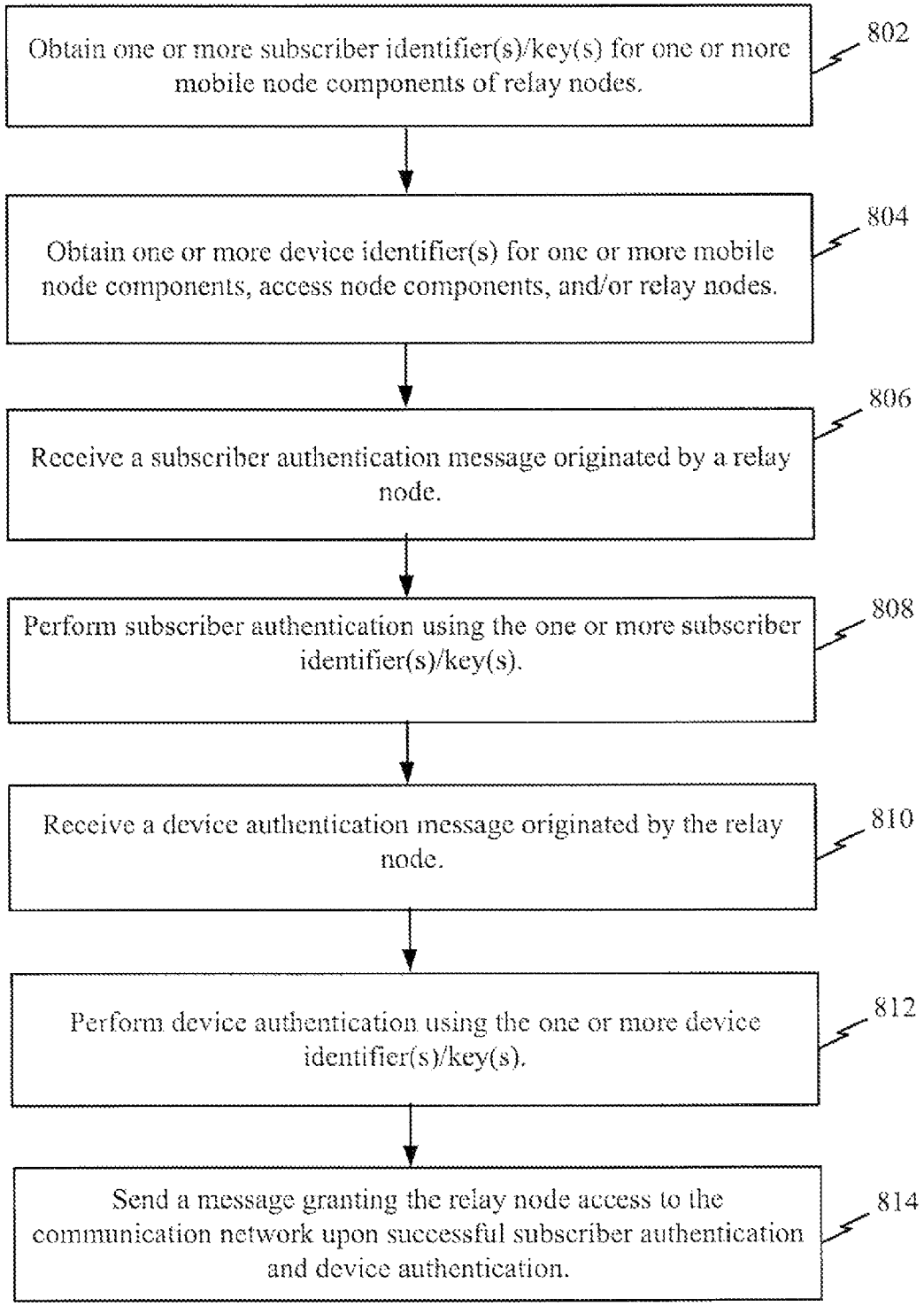
FIG. 8 illustrates a method operational in an authentication node to mitigate attacks on a relay node by performing device authentication.

FIG. 8 illustrates a method operational in an authentication node to mitigate attacks on a relay node by performing device authentication. The relay node may operate between a network access node and a mobile node. The relay node may include an access node module and a mobile node module. The authentication node may obtain one or more subscriber identifier(s)/key(s) for one or more mobile node components of relay nodes 802. Additionally, the authentication node may also obtain one or more device identifier(s)/key(s) for one or more mobile node components, access node components, and/or relay nodes 804.

Subsequently, the authentication node may receive a subscriber authentication message originated by a relay node 806. The authentication node may then perform subscriber authentication using the one or more subscriber identifier(s)/key(s) 808.

Additionally, the authentication node may receive a device authentication message originated by the relay node 810. The authentication node may then perform device authentication using the one or more device identifier(s)/key(s) 812.

Upon successful subscriber authentication and device authentication, the authentication node may send a message granting the relay node access to the communication network 814.

One or more of the components, steps, features and/or functions illustrated in FIG. 1, 2, 3, 4, 5, 6, 7, and/or 8 may be rearranged and/or combined into a single component, step, feature or function or embodied in several components, steps, or functions. Additional elements, components, steps, and/or functions may also be added without departing from the invention. The apparatus, devices, and/or components illustrated in FIG. 1, 5, and/or 5 may be configured to perform one or more of the methods, features, or steps described in FIG. 4, 6, and/or 8. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The terms "machine-readable medium", "computer-readable medium", and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium", "computer-readable medium", and/or "processor-readable medium" and executed by one or more processors, machines and/or devices.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational in a relay node, comprising:
configuring the relay node to operate between a first access node and a first mobile node by relaying traffic between the first access node and the first mobile node, the first access node equipped to provide access to a communications network, where
a first communication interface of the relay node is adapted to communicate with the first access node utilizing a first signaling protocol, the relay node appearing as a second mobile node to the first access node, and
a second communication interface adapted to communicate with the first mobile node utilizing a second signaling protocol, the relay node appearing as a second access node to the first mobile node;
sending a device authentication message from the relay node to the first access node to enable device authentication of the relay node; and
sending a subscriber authentication message from the relay node to the first access node to enable subscriber authentication of the relay node, wherein the device authentication is bound to the subscriber authentication in determining whether the relay node can obtain service over the communication network accessed via the first access node and wherein the relay node is granted access to communicate with the communications network upon both successful subscriber authentication and successful device authentication.

2. The method of claim 1, further comprising:
obtaining access to the communication network upon receiving signals from the access node indicating that successful subscriber authentication and device authentication has been granted.

3. The method of claim 1, further comprising:
receiving a service grant message from the access node granting access to the communication network upon successful subscriber authentication and device authentication; and
receiving a service denied message from the access node denying access to the communication network upon unsuccessful subscriber authentication or device authentication.

4. The method of claim 1, wherein the device authentication message and the subscriber authentication message are sent concurrently from the relay node to the access node as a single authentication message.

5. The method of claim 1, wherein the first communication interface uses over-the-air signaling to communicate with the first access node.

6. The method of claim 1, wherein device authentication is performed using at least one of a device identifier or a device key unique to the relay node and stored in a secure, non-removable storage device within the relay node.

7. The method of claim 6, wherein the device identifier is at least one of an International Mobile Equipment Identity (IMEI) for the relay node, an access node module within the relay node, or a mobile node module within the relay node.

8. The method of claim 1, wherein the first communication interface is part of a mobile access module adapted to operate as an enhanced Node B for a Long Term Evolution-compliant network.

9. The method of claim 1, wherein the first communication interface is part of a mobile node module of the relay node and the second communication interface is part of an access node module of the relay node.

10. The method of claim 1, wherein subscriber authentication is subsequently repeated more frequently than device authentication.

11. The method of claim 1, further comprising:
configuring the relay node to translate traffic of a first packet type received over the first communication interface to a second packet type for transmission over the second communication interface to the mobile node; and
configuring the relay node to translate traffic of the second packet type received over the second communication interface to the first packet type for transmission over the first communication interface to the access node.

12. The method of claim 1, further comprising:
configuring the relay node to translate data traffic transmissions between the first communication interface and the second communication interface from a first signal type associated with the first signaling protocol to a second signal type associated with the second signaling protocol.

13. The method of claim 1, wherein one or more of a subscriber identifier or a key used in subscriber authentication is pre-associated with a device type, and subscriber authentication is successful if the device authentication identifies the same device type.

14. The method of claim 1 wherein the first and second signaling protocols are the same.

15. The method of claim 1 wherein the first and second signaling protocols are Evolved Universal Terrestrial Access (E-UTRA) protocols.

16. The method of claim 1 wherein the first and second signaling protocols are different over-the-air communication protocols.

17. The method of claim 1 wherein the relay node appears as a user equipment (UE) to the first access node.

18. The method of claim 1 wherein the relay node appears as an enhanced Node B (eNB) to the first mobile node.

19. A relay node, comprising:
a first communication interface adapted to communicate with a first access node utilizing a first signaling protocol, the relay node appearing as a second mobile node to the first access node, the first access node equipped to provide access to a communications network;
a second communication interface adapted to communicate with a first mobile node utilizing a second signaling protocol, the relay node appearing as a second access node to the first mobile node; and
a processing circuit coupled to the first communication interface and the second communication interface, the processing circuit adapted to:
relay traffic between the first access node and the first mobile node,
send a device authentication message from the relay node to the first access node via the first communication interface to enable device authentication of the relay node, and
send a subscriber authentication message from the relay node to the first access node via the first communication interface to enable subscriber authentication of the relay node, wherein the device authentication is bound to the subscriber authentication in determining whether the relay node can obtain communication service over the communication network accessed via the first access node and wherein the relay node is granted access to communicate with the communications network upon both successful subscriber authentication and successful device authentication.

20. The relay node of claim 19, wherein the processing circuit is further adapted to:
obtain access to the communication network upon receiving signals from the access node indicating that successful subscriber authentication and device authentication has been granted.

21. The relay node of claim 19, wherein the processing circuit is further adapted to:
receive a service grant message from the access node granting access to the communication network upon successful subscriber authentication and device authentication; and
receive a service denied message from the access node denying access to the communication network upon unsuccessful subscriber authentication or device authentication.

22. The relay node of claim 19, further comprising:
a non-removable secure storage device coupled to the processing circuit, the non-removable secure storage device storing at least one of a device identifier or a key unique to the relay node and used for device authentication.

23. The relay node of claim 22, wherein the device identifier is at least one of an International Mobile Equipment Identity (IMEI) for an relay node, an access node module within the relay node, or a mobile node module within the relay node.

24. The relay node of claim 19, wherein the first communication interface uses over-the-air signaling to communicate with the first access node.

25. The relay node of claim 19, further comprising:
a mobile node module including the first communication interface and a non-removable storage device for storing one or more mobile node identifiers and keys used for device authentication.

26. The relay node of claim 19, further comprising:
an access node module including the second communication interface and a non-removable storage device for storing one or more access node identifiers and keys used for device authentication.

27. The relay node of claim 19, wherein the processing circuit is further adapted to:
translate data traffic transmissions between the first communication interface and the second communication interface from a first signal type associated with the first signaling protocol to a second signal type associated with the second signaling protocol.

28. A relay node, comprising:
means for communicating with a first access node utilizing a first signaling protocol, the relay node appearing as a second mobile node to the first access node, the first access node equipped to provide access to a communications network;
means for communicating with a first mobile node utilizing a second signaling protocol, the relay node appearing as a second access node to the first mobile node;
means for relaying traffic between the first access node and the first mobile node;
means for sending a device authentication message from the relay node to the first access node to enable device authentication of the relay node; and
means for sending a subscriber authentication message from the relay node to the first access node to enable subscriber authentication of the relay node, wherein the device authentication is bound to the subscriber authentication in determining whether the relay node can obtain communication service over the communication network accessed via the first access node and wherein the relay node is granted access to communicate with the communications network upon both successful subscriber authentication and successful device authentication.

29. The relay node of claim 28, further comprising:
means for obtaining access to the communication network upon receiving signals from the access node indicating that successful subscriber authentication and device authentication has been granted.

30. The relay node of claim 28, further comprising:
means for securely and non-removably storing at least one of a device identifier or key.

31. The relay node of claim 28, further comprising:
means for translating data traffic transmissions between a first communication interface and a second communication interface of the relay node, from a first signal type associated with the first signaling protocol to a second signal type associated with the second signaling protocol.

32. A non-transitory processor-readable storage medium comprising one or more instructions operational on a relay node adapted to operate between a first mobile node and a first access node, which when executed by a processing circuit, causes the processing circuit to:
communicate with a first access node via a first communication interface utilizing a first signaling protocol, the relay node appearing as a second mobile node to the first access node, the first access node equipped to provide access to a communications network;

communicate with a first mobile node via a second communication interface utilizing a second signaling protocol, the relay node appearing as a second access node to the first mobile node;

relay traffic between the first access node and the first mobile node;

send a device authentication message from the relay node to the first access node via the first communication interface to enable device authentication of the relay node; and send a subscriber authentication message from the relay node to the first access node via the first communication interface to enable subscriber authentication of the relay node, wherein the device authentication is bound to the subscriber authentication in determining whether the relay node can obtain communication service over the communication network accessed via the first access node and wherein the relay node is granted access to communicate with the communications network upon both successful subscriber authentication and successful device authentication.

33. The non-transitory processor-readable storage medium of claim 32, comprising one or more instructions which when executed by a processing circuit, causes the processing circuit to:

obtain access to the communication network upon receiving signals from the access node indicating that successful subscriber authentication and device authentication has been granted.

34. A method operational in a network authentication entity of a communication network, comprising:

receiving a device authentication message originated by a relay node that operates between a first mobile node and a first access node, wherein the relay node is configured to communicate between the first mobile node and the first access node utilizing first and second signaling protocols, respectively, and wherein the first access node is equipped to provide access to a communications network;

performing device authentication based on one or more device identifiers or keys associated with the relay node, an access node module of the relay node, or a mobile node module of the relay node;

receiving a subscriber authentication message originated by the relay node;

performing subscriber authentication of the relay node based on one or more subscriber identifiers or keys associated with the relay node; and sending a message granting the relay node access to the communication network upon both successful subscriber authentication and device authentication, wherein the device authentication is bound to the subscriber authentication in determining whether the relay node can obtain communication service over the communication network.

35. The method of claim 34, further comprising:
sending a message to the relay node denying the relay node access to the communication network upon one or more of unsuccessful subscriber authentication or device authentication.

36. The method of claim 34, further comprising:
sending a first message to the relay node to initiate device authentication; and sending a second message to the relay node to initiate subscriber authentication.

37. The method of claim 34, wherein one or more of a subscriber identifier or key used in subscriber authentication is pre-associated with a device type, and subscriber authentication is successful if the device authentication identifies the same device type.

38. The method of claim 34, wherein device authentication is performed by a device authentication node while subscriber authentication is performed by a subscriber authentication node.

39. The method of claim 34, wherein the device authentication message and the subscriber authentication message are received concurrently as a single authentication message.

40. An authentication entity, comprising:

a communication interface adapted to communicate with a relay node over a communication network;

a processing circuit coupled to the communication interface, the processing circuit adapted to:

receive a device authentication message originated by the relay node that operates between a first mobile node and a first access node, wherein the relay node is configured to communicate with the first mobile node and the first access node utilizing first and second signaling protocols, respectively, and wherein the first access node is equipped to provide access to the communications network from the relay node;

perform device authentication of the relay node based on one or more device identifiers or keys associated with the relay node, an access node component of the relay node, or a mobile node component of the relay node;

receive a subscriber authentication message originated by the relay node;

performing subscriber authentication based on one or more subscriber identifiers or keys associated with the relay node wherein device authentication is bound to subscriber authentication in determining whether the relay node can obtain service over the communication network; and send a message granting the relay node access to the communication network upon both successful subscriber authentication and device authentication.

41. The authentication entity of claim 40, wherein the processing circuit is further adapted to:

send a message denying the relay node access to the communication network upon one or more of unsuccessful subscriber authentication or device authentication.

42. The authentication entity of claim 41, further comprising:

a device authentication node to perform device authentication; and a subscriber authentication node to perform subscriber authentication.

43. An authentication entity of a communication network, comprising:

means for receiving a device authentication message originated by a relay node that operates between a first mobile node and a first access node, wherein the relay node is configured to communicate with the first mobile node utilizing a first signaling protocol and with the first access node utilizing a second signaling protocol;

means for performing device authentication based on one or more device identifiers or keys associated with the relay node, an access node component of the relay node, or a mobile node component of the relay node;

means for receiving a subscriber authentication message originated by the relay node;

means for performing subscriber authentication based on one or more subscriber identifiers or keys associated with the relay node wherein device authentication is bound to subscriber authentication in determining whether the relay node can obtain service over the communication network; and means for sending a message granting the relay node access to the communication network upon both successful subscriber authentication and device authentication.

44. A non-transitory processor-readable storage medium comprising one or more instructions operational on an authentication entity operating within a core communication network, which when executed by a processing circuit, causes the processing circuit to:

receive a device authentication message originated by a relay node that operates between a first mobile node and a first access node, wherein the relay node is configured to communicate with the first mobile node utilizing a first signaling protocol and with the first access node utilizing a second signaling protocol;

perform device authentication based on one or more device identifiers or keys associated with the relay node, an access node component of the relay node, or a mobile node component of the relay node;

receive a subscriber authentication message originated by the relay node;

perform subscriber authentication based on one or more subscriber identifiers or keys associated with the relay node wherein device authentication is bound to subscriber authentication in determining whether the relay node can obtain service over the communication network; and send a message granting the relay node access to the communication network upon both successful subscriber authentication and device authentication.

* * * * *